United States Patent [19]

Ooshiro et al.

[11] 4,236,753
[45] Dec. 2, 1980

[54] SEAT RECLINING APPARATUS

[75] Inventors: Hideyuki Ooshiro, Toyota; Masakazu Chiba, Susono, both of Japan

[73] Assignees: Shiroki Kinzoku; Toyota Jidosha Kogyo Kabushiki Kaisha, both of Japan

[21] Appl. No.: 12,404

[22] Filed: Feb. 15, 1979

[30] Foreign Application Priority Data

Mar. 20, 1978 [JP] Japan ............................. 53-34686[U]
Dec. 4, 1978 [JP] Japan ........................... 53-165980[U]

[51] Int. Cl.³ ............................................ A47C 1/026
[52] U.S. Cl. .................................... 297/364; 16/144; 297/373
[58] Field of Search ............................. 297/363–365, 297/354, 355, 379, 373, 370, 371, 366, 367; 292/140, 165, 169; 16/143, 144, 139

[56] References Cited

U.S. PATENT DOCUMENTS

| 1,019,282 | 3/1912 | Strouse et al. | 292/140 |
| 3,099,485 | 7/1963 | Beierbach et al. | 297/373 |
| 3,958,828 | 5/1976 | Ishida et al. | 297/367 X |

FOREIGN PATENT DOCUMENTS 1283294 12/1961 France .................................... 297/362

Primary Examiner—William E. Lyddane
Attorney, Agent, or Firm—William A. Drucker

[57] ABSTRACT

A seat reclining mechanism, for example for vehicle seats, is of the kind having first and second arms for attachment to portions of a seat. Each arm has a respective internal gear secured to it, and the gears are coaxial and the arms can rotate mutually about a pivot. An external gear is slidable axially on the pivot for movement into engagement with one or the other or both of the internal gears to lock them together. The improvement of the invention is an arrangement for shifting the external gear axially into and out of engagement with the internal gears. The arrangement has a plurality of operation elements secured on and extending axially from the external gear, and an axially acting cam engaging the operation elements for shifting them and the external gear axially of the pivot. The cam may be a rotary cam or a linearly slidable cam.

3 Claims, 6 Drawing Figures

SEAT RECLINING APPARATUS

DETAILED DESCRIPTION OF THE INVENTION

This invention relates to an improvement to a seat reclining apparatus for adjusting the angle of inclination of the reclining seat of a car by use of engaging mechanism between internal gears and an external gear.

The object of the present invention is to secure the lock position of the reclining seat even when a large load is applied thereto, to improve safety of the occupant and to stabilize the action of an adjusting lock for adjusting the angle of inclination and the releasing action of the lock.

Figure 1:
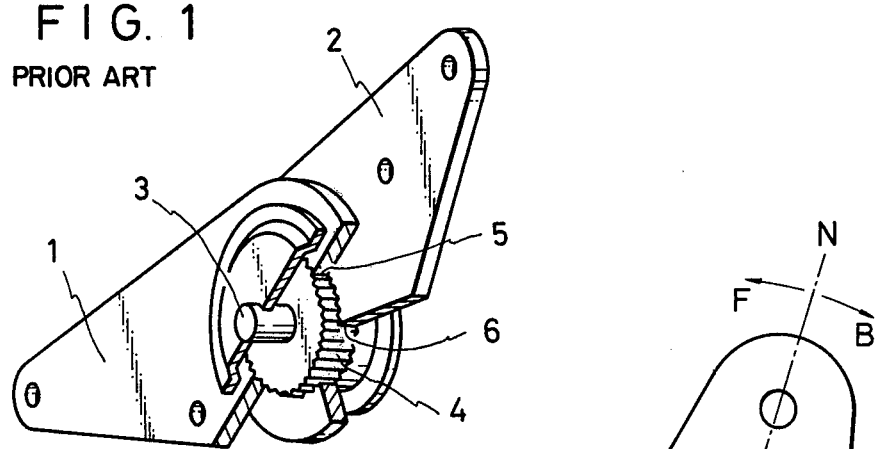

It is one of requisites for the reclining seat of a car to maintain safety capable of sufficiently withstanding an excessively large impact load under a normal condition. To satisfy this requirement, there has been offered conventionally a seat reclining apparatus of the type which includes, as shown in FIG. 1, a lower arm 1 and an upper arm 2 interconnected to each other via a pivot 3, inner gears 5 and 6 concentrical with each other with the pivot 3 being at their center, and an external gear 4 pivoted on the pivot 3 slidably in the axial direction so as to engage simultaneously with both of the inner gears 5 and 6 around their entire circumferences so that the external gear 4 is caused to slide in the axial direction of the pivot 3 and disengaged from either one of the inner gears 5 and 6 when lock of the seat is released.

In the conventional apparatus of the above-described type, a large load acting on the reclining seat is borne while the inner gears and the external gear engage with each other, thereby establishing the lock state. However, this apparatus requires complicated drive mechanisms for the engagement of the external gear with the internal gears, for the locking of their engagement and for releasing the locking. These mechanisms result in various problems such as increase in the weight, smoothness of action, space requirement, an increased number of assembly steps due to the increase in the number of components and consequent increase in the cost of production, and so forth. Accordingly, solution of these problems has been looked for earnestly in the art.

In other words, the drive mechanism of the external gear in the conventional apparatus has the construction wherein a coil spring interposed on one side of the external gear urges the external gear and causes it to engage with both internal gears simultaneously. In order to release the lock by disengaging the external gear from either one of the internal gears, a cam member and a ball together push the external gear against the resiliency of the coil spring whereby said cam member is caused to rotate by a lever on the opposite side of the external gear with respect to the side urged by the coil spring, and said ball is pushed and moved by this cam member. Accordingly, if the resiliency of the coil spring is somehow lost due to its fatigue or breakage, it is no longer possible to return reliably the external gear to its lock position.

Since the lock engagement between the external gear and the internal gears is solely dependent on the spring force, smooth engagement can not be obtained when these gears engage with each other with a considerable phase difference because of the frictional force of engagement arising from their tooth shapes, apart from the normal desirable case where the tooth tops are in perfect conformity with the mating bottom lands. In order to solve this problem, a coil spring having greater resiliency must be used. However, the use of such coil spring results in the increase in the operation force for releasing the lock.

The present invention provides an apparatus which solves the abovementioned problems of the conventional apparatus and is characterized in that the external gear is driven compulsively for movement both to its lock position and to its lock-release position by the same mechanism.

Figure 2:
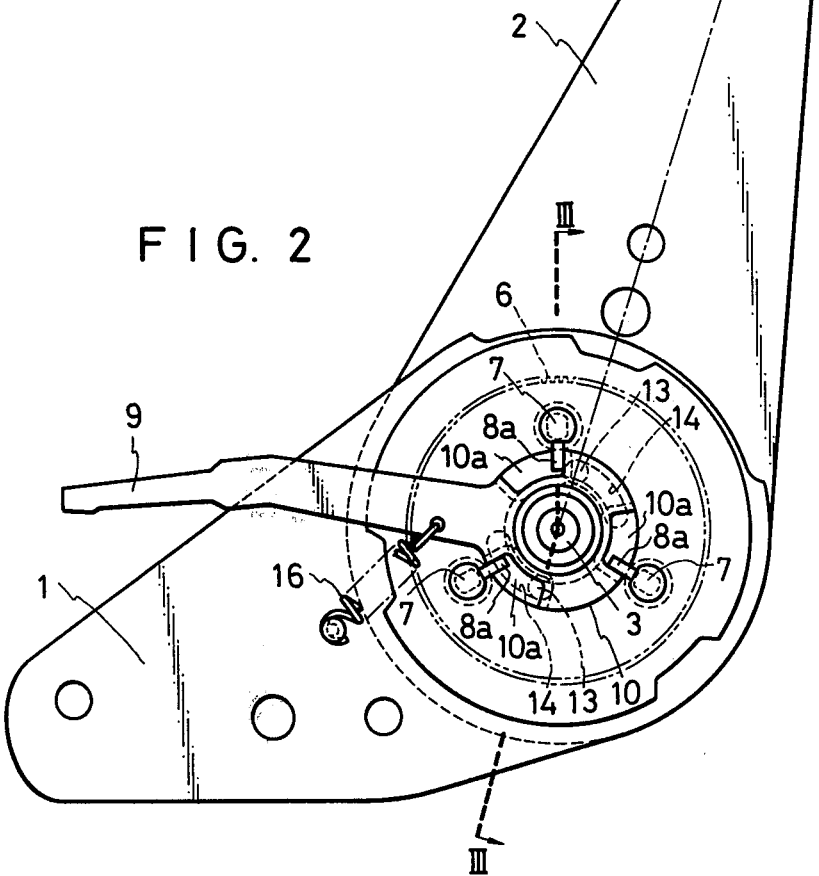
Figure 3:
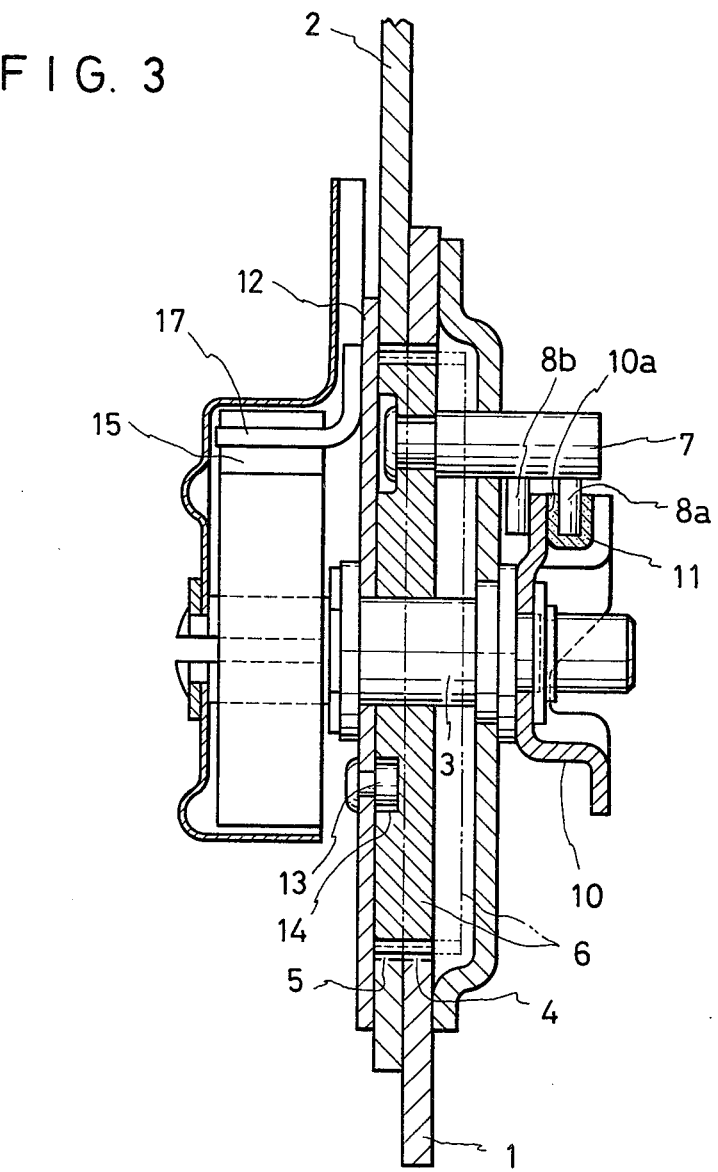
Figure 4:
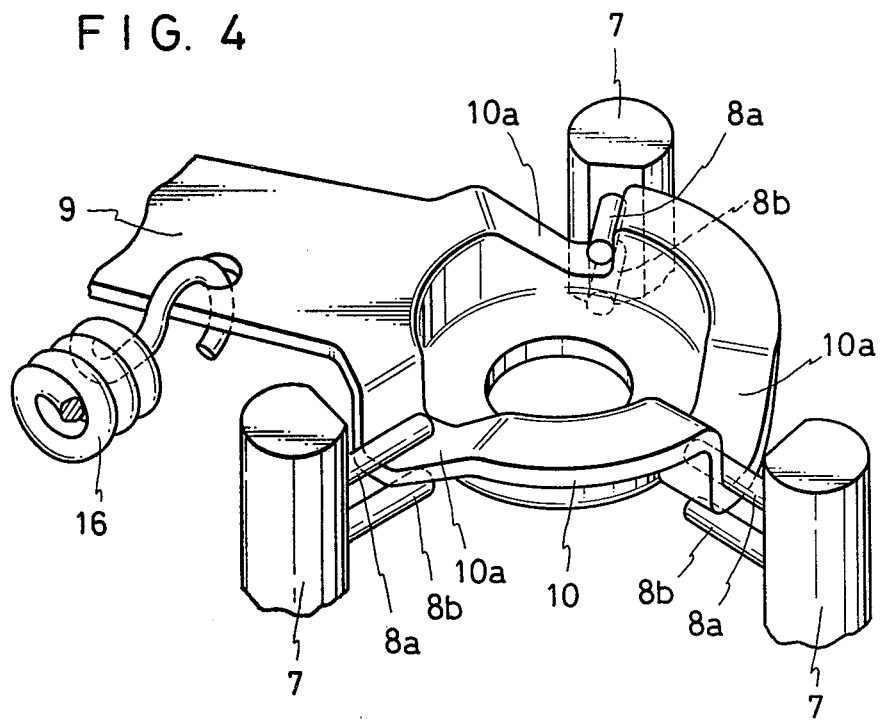
Figure 5:
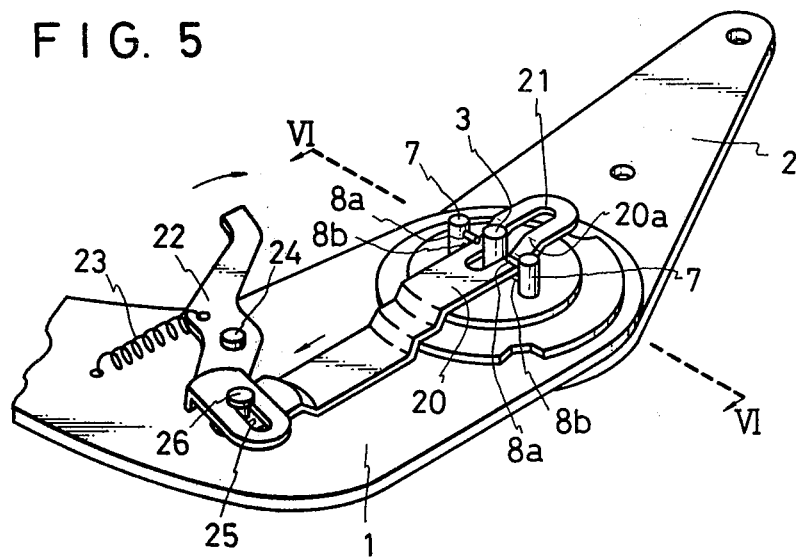
Figure 6:
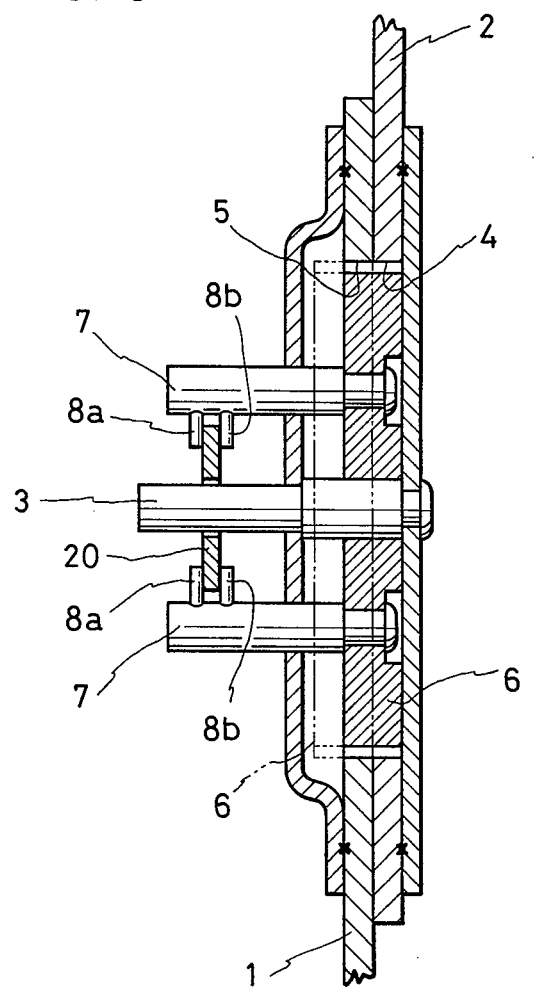

FIG. 1 is a schematic view of the conventional seat reclining apparatus in general using the abovementioned gear mechanism between the internal gears and the external gear;

FIGS. 2 through 4 illustrate an embodiment of the apparatus in accordance with the present invention wherein FIG. 2 is a side view, FIG. 3 is an enlarged sectional view taken along line III—III of FIG. 2 and FIG. 4 is a perspective view of the cam member; and FIGS. 5 and 6 illustrate another embodiment of the apparatus of the present invention wherein FIG. 5 is a side perspective view and FIG. 6 is an enlarged sectional view taken along line VI—VI of FIG. 5.

The first embodiment of the apparatus of the present invention will now be explained with reference to FIGS. 2 through 4.

In FIGS. 2 and 3, reference numeral 1 represents a lower arm which is secured to the side of the seat section of the seat and reference numeral 2 represents an upper arm which is secured to the side of the back section of the seat. The lower arm 1 and the upper arm 2 are interconnected to each other by a pivot 3 and the upper arm 2 is able to turn back and forth with the pivot 3 being as its center. Internal gears 4 and 5 are disposed respectively on the lower and upper arms 1 and 2 concentrically with each other.

A flat type external gear 6 engaging with these internal gears 4 and 5 is supported by the pivot 3 turnably and slidably in the axial direction.

An operation rod 7 is shown secured to the external gear 6 with such an axis as is parallel to the pivot 3 which is normal to the side surface of the external gear 6. From the aspect of optimum balance, it is preferred that at least three operation rods 7 are disposed equidistantly from each other.

To one end of the pivot 3 is rotatably fitted a cam member 10 which moves the operation rod(s) 7 in the axial direction. As can be seen clearly from FIG. 4, this cam member 10 is equipped with a cam face 10a corresponding to each of the operation rods 7 and a lever 9 is integrally formed with the cam member 10 for rotary operation of the latter. Reference numeral 16 represents a return spring hooked up onto the lower arm 1 and the lever 9.

As shwon in the drawing, the engaging mechanism between the cam member 10 and the operation rods 7 is made by means of two pins 8a and 8b that are fitted protrusively to each operation rod 7 and interpose the mating cam face 10a between them from both inner and outer surfaces. Reference numeral 11 represents a resilient member which is fitted to one (8a) of the pins and prevents metallic contact between the pin 8a and the cam face 10a and occurrence of offensive noise at the time of their mutual striking action.

Reference numeral 12 represents a side plate which is integral with the upper arm 2, and an engaging member 17 is secured to the side plate, engages with the outermost end of a coil spring 15 of which the innermost end is secured to the other end of the pivot 3, and thus provides the upper arm 2 with the revolving force in the forward revolving direction constantly.

As depicted in FIGS. 2 and 3, arc grooves 14 are formed on the side surface of the external gear 6 with the pivot 3 being as their center and pins 13 secured to the abovementioned side plates 12 are slidably fitted into these arc grooves 14, respectively. However, the pins 13 are inserted into the respective arc grooves 14 when the external gear 6 engages simultaneously with both internal gears 4 and 5 at the positions indicated by full line in FIG. 3 but come out therefrom when the external gear 6 engages with one (4) of the internal gears 4 and 5 at the position indicated by imaginary line in FIG. 3. In addition, when the upper arm 2 rotates forwardly from a predetermined angle, the end surface of the pin 13 butts against the side surface of the external gear 6 out of the arc groove 14 and thus restricts the movement of the external gear 6 in the direction of lock position.

Next, the explanation is given on the action of the above-described construction. Locking of the upper arm 2 is made in the following manner. As shown in FIGS. 2 and 3, the lever 9 is located at its original position by the return spring 16 and the operation rod 7 is pushed leftwards, as viewed in FIG. 2, by means of the cam face 10a of the cam member 10 via the pin 8b. In this case, the external gear 6 is caused to move to the position where it engages both internal gears 4 and 5 simultaneously and thus restricts revolution of the upper arm 2.

When the lever 9 is pulled up in FIG. 2, the cam face 10a of the cam member 10 pulls the operation rod 7 rightwards, as viewed in FIG. 3, via the pin 8a whereby the external gear 6 is caused to move up to the position indicated by the imaginary line in FIG. 3 so that the external gear 6 disengages from the internal gear 5 of the upper arm 2, thereby allowing free rotation of the upper arm 2 back and forth. Accordingly, a desired angle of inclination of the reclining seat can be selected while the lever 9 is being pulled up, and as soon as the pull-up of the lever 9 is released, the external gear 6 is again caused to engage with both of the internal gears 4 and 5 and thus locks the upper arm.

If the apparatus is furnished with the construction wherein the arc groove 14 is formed on the side surface of the external gear 6 and the pin 13 to be fitted into the groove 14 is secured onto the side plate 12, when the upper arm 2 is inclined rearwardly from a predetermined angle of inclination N to the position B while the external gear 6 is being disengaged from the internal gear 5 of the upper arm 2, the pin 13 is inserted into the groove 14 within the range of the groove and the reclining seat can be locked at a free position having an angle of inclination that falls within the corresponding range between the arc groove 14 and the pin 13. In the case of the forward inclination of the reclining seat from the predetermined angle of inclination N of the upper arm 2 to the position A, on the other hand, the pin 13 comes off from the arc groove 14 and comes into sliding contact with the side surface of the external gear 6. Accordingly, even when the pull-up of the lever 9 is released by inclining the reclining seat forwardly, the external gear 6 is not allowed to return the lock position where it engages with the internal gear 5 of the upper arm 2 because the movement of the external gear 6 is restricted by the pin 13. Only when the reclining seat is returned to its predetermined angle of inclination N, the arc groove 14 corresponds to its mating pin 13 and the external gear 6 is allowed to move to the lock position.

Next, the second embodiment of the apparatus of the present invention will be explained by referring to FIGS. 5 and 6.

The basic construction of this embodiment is the same as that of the first embodiment. Namely, reference numeral 1 represents the lower arm secured to the side surface of the seat section of the reclining seat and 2 denotes the upper arm secured to the side of the back section of the reclining seat. The lower arm 1 and the upper arm 2 are interconnected to each other by the pivot 3 and the upper arm 2 is capable of turning back and forth with the pivot 3 being as its center. The internal gears 4 and 5 are respectively furnished to the lower arm 1 and the upper arm 2 concentrically with each other. The flat type external gear 6 capable of engaging with these internal gears 4 and 5 over their entire circumferences is pivoted on the pivot 3 slidably in the axial direction.

Two operation rods 7 are formed protrusively on the side surface of the external gear 6 with their axis being parallel to the pivot 3. One end of each rod 7 is secured to the external gear. Two pins 8a and 8b are implanted at the other end of each operation rod 7 in the direction perpendicular to the axis of the rod 7 so that each pin 8a, 8b of each rod is opposite to the other pin 8a, 8b of the other rod 7.

A cam lever 20 capable of engaging with these pins 8a, 8b and sliding linearly is slidably supported by the pivot 3 via an elongated guide hole 21 formed at one end portion of the cam lever.

An operation lever 22 pulled by the return spring 23 is pivoted by the lower arm 1 and allowed to rotate freely by means of a pin 24. The tip portion of the operation lever 22 is connected to the other end of the above-mentioned cam lever 20. Reference numeral 25 represents an elongated hole formed at the tip portion of the operation lever 22, and a pin 26 secured to the other end of the cam lever 20 engages slidably with this elongated hole 25 and connects the operation lever 22 to the cam lever 20. Bent cam faces 20a are formed on the tip portion of the cam lever 20 where it engages with the pins 8a, 8b, in order to apply the linear sliding motion of the cam lever 20 to the operation rods 7 as the reciprocating motion in the axial direction.

The action of the above-described construction is as follows. As shown in FIGS. 5 and 6, locking of the upper arm 2 is effected as the operation lever 22 is retained at its original position by the return spring 23 and the cam faces 20a of the cam lever 20 push the operation rods 7 rightwardly as viewed in FIG. 6 via the pins 8a, 8b whereby the external gear 6 engages with both of the internal gears 4 and 5 simultaneoulsy over their entire circumferences and thus restricts the revolution of the upper arm 2.

When the operation lever 22 is rotated in the direction indicated by arrow in FIG. 5 against the resiliency of the return spring 23, the cam lever 20 slides linearly along the elongated guide hole 21 in the direction indicated by arrow in FIG. 5, and the cam faces 20a push the operation rods 7 via the pins 8a, 8b leftwardly as viewed in FIG. 6. In consequence, the external gear 6 moves on the pivot 3 up to the position indicated by the imaginary line in FIG. 6, disengages from the internal gear 4 of the upper arm 2, thus releases the locking of the upper arm 2 and allows it to rotate freely back and forth. Accordingly, if a desired angle of inclination of the reclining seat is selected while the operation lever 22 is operated and the operation of the lever 22 is then released, the external gear 6 again engages with both internal gears 4 and 5 over their entire circumferences and locks the reclining seat at the desired angle of inclination. Though not shown particularly in FIGS. 5 and 6, the upper arm 2 is constantly applied with a rotary force in the direction of forward inclination by a spiral spring in the same way as in the first embodiment.

As described in the foregoing paragraph, the apparatus of the present invention is locked by means of the simultaneous engagement of the external gear with the internal gears disposed respectively to the lower and upper arms over their entire circumferences. Hence, the apparatus of the present invention is naturally capable of reliably coping with a large load applied to the reclining seat and ensuring high safety. Since the drive mechanism of the external gear for locking and releasing the lock consists of the engaging construction between the cam member actuated by the operation lever and the operation rods secured to the external gear, the motion of the cam member is directly transmitted to the external gear via the operation rods without calling for the resiliency of spring in any direction, thereby providing the safe and reliable lock and lock-release actions over an extended period. It is possible in accordance with the apparatus of the present invention to simplify markedly the construction and to reduce the weight and size of the apparatus. Moreover, the apparatus can be assembled easily and produced economically.

What is claimed is:

1. In a seat reclining mechanism having:
   (i) a first arm having a first internal gear secured thereto,
   (ii) a second arm having a second internal gear secured thereto,
   (iii) a pivot having an axis and on which said first and second arms are disposed in mutually rotatable manner with said first and second internal gears concentric with said pivot axis,
   (iv) an external gear slidable axially on said pivot and concentric with said first and second internal gears and adapted to engage with both and either one of said internal gears about the entire circumference thereof,
   the improvement which comprises:
   (a) a plurality of operation elements secured on said external gear and extending axially therefrom,
   (b) a cam engaging with said operation elements and arranged to act axially of the pivot, and
   (c) an operation member fast with said cam, for moving said cam to cause axial shifting of said rods and the external gear.

2. A seat reclining mechanism, as claimed in claim 1, wherein each said operation element carries two abutments spaced in the direction parallel to the axis of the pivot, and said cam is rotatable and is engaged between said abutments.

3. A seat reclining mechanism, as claimed in claim 1, wherein each said operation element carries two abutments spaced in the direction parallel to the axis of the pivot, and said cam is slidable and is engaged between said abutments.

* * * * *